Jan. 26, 1960  E. D. SMITH  2,922,895
INDUCTION GENERATOR SYSTEM
Filed Aug. 29, 1955  2 Sheets-Sheet 2

INVENTOR
Earl D. Smith
BY E. W. Christen
ATTORNEY

United States Patent Office 2,922,895
Patented Jan. 26, 1960

2,922,895
INDUCTION GENERATOR SYSTEM

Earl D. Smith, La Grange, Ill., assignor to General Motors Corporation, Detroit, Mich., a corporation of Delaware Application August 29, 1955, Serial No. 531,223

14 Claims. (Cl. 290—40)

This invention relates to electrical generator systems and more particularly to such systems employing a dynamo-electric machine of that type known as an induction generator.

The induction generator, although it has been known for many years, has not attained any great degree of commercial acceptance. The commercial usage of the induction generator heretofore has been confined largely to central station operation in which it is supplied with excitation current from an external source, usually from parallel connected alternators. The use of induction generators in isolated systems requires self-excitation, for example, by the use of exciting capacitors, and as a result is attended with an undesirable regulation characteristic. Consequently, the synchronous generator or alternator has taken preference in such systems over the induction generator.

The induction generator, however, offers many attractive features not afforded by the alternator. The induction generator, in mechanical structure, may be identical to an induction motor including the use of the squirrel cage rotor construction. It requires no slip rings, commutator, or brushes and structural features for the support of a separate exciter machine are unnecessary. Consequently, the induction generator is of extremely rugged and inexpensive construction, suitable for a wide variety of operating conditions, and requires a minimum of maintenance.

These features are very desirable in many applications requiring an isolated generator system. For example, the induction generator is highly advantageous for service as the electrical power source of a railway refrigeration car. The electrical load in such an application comprises intermittently energized driving motors for the associated refrigeration compressors, fans and blowers and the generator is required to supply power of relatively low lagging power factor. The generator is subjected to adverse and extreme variations of ambient conditions and rugged construction is essential. In mobile installations of this type, the reduction of maintenance time, made possible by the elimination of brush-type contacts, is of great advantage.

It is an object of this invention to provide an improved electrical generating system employing an induction generator.

It is another object of this invention to provide an improved alternating current generating system which does not require the use of brushes, slip rings, or commutators.

It is a further object of this invention to provide a self-excited induction generator system in which the generator output is regulated to maintain a substantially constant value of volts per cycle.

It is another object of this invention to provide an improved method of operation of an induction generator.

Another object of this invention is to provide a method of operation for an induction generator interconnected with an induction motor.

An additional object of this invention is to provide an improved regulating system for a self-excited induction generator in which the output is regulated in response to the voltage per cycle ratio of the generator.

In the attainment of these objects there is provided an induction generator driven by a variable speed prime mover. Regulation is accomplished by energizing a voltage per cycle ratio responsive means from the generator output and controlling the speed of the prime mover in accordance with this ratio. The prime mover speed is adjusted upon departure of this ratio from a predetermined value of voltage per cycle.

A more complete understanding of the invention may be had from the detailed description which follows taken with the accompanying drawings in which:

Figure 1a is an enlarged view of a portion of Figure 1.

Figure 1:
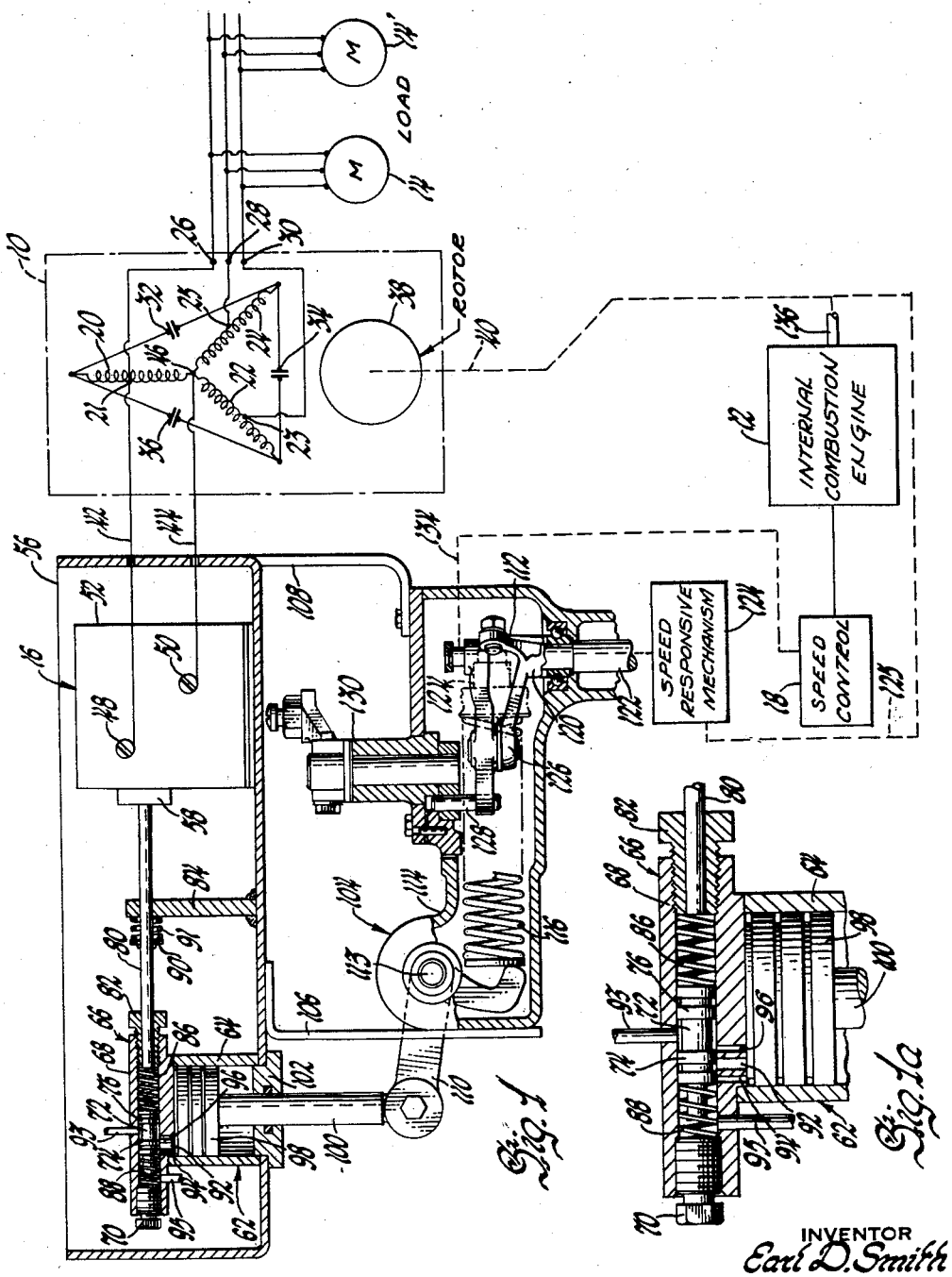
Figure 1 is a diagrammatic representation of the inventive system.

Referring now to the drawings, there is shown an illustrative embodiment of the invention in an electrical generating system employing a self-excited induction generator. In general, the system comprises an induction generator 10 driven by a variable speed prime mover 12 for supplying electrical power to a typical load 14 and 14'. Regulation of the electrical output of the generator 10 is provided by a voltage per cycle responsive relay, designated generally at 16, which operates through a power actuator 62 and variable speed governor 104 to adjust the speed control means 18 of the variable speed prime mover 12.

In greater detail, the induction generator 10 in the illustrative embodiment is of the polyphase type including Y-connected stator windings 20, 22, and 24. Output terminals 26, 28, and 30 are connected respectively to intermediate taps 21, 23, and 25 on the stator windings 20, 22, and 24. Self-excitation for the generator is provided by the fixed capacitors 32, 34, and 36 which are connected across adjacent terminals of the stator windings. The rotor 38, preferably of the squirrel cage winding type, is provided with a driving shaft 40 to permit mechanical coupling with the prime mover 12.

Figure 2:
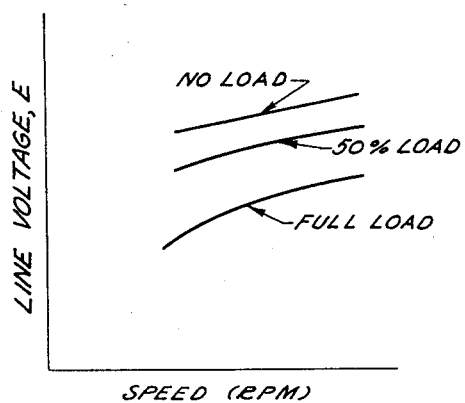
Figure 2 illustrates typical characteristics of an induction generator showing line voltage as a function of speed.

The self-excited induction generator just described will develop an initially small value of terminal voltage upon rotation of the rotor because of the residual magnetic flux in the rotor and stator cores. The operation of the induction generator requires an exciting or magnetizing current which is of leading phase angle with respect to the terminal voltage. This leading component of current in the stator windings is provided by the exciting capacitors when the rotor speed exceeds a certain value which is determined by the parameters of the machine and the value of the capacitors. At this value of speed the magnetic field is strongly reinforced and, in operation under no load, the terminal voltage developed by the stator windings will reach a value which may be represented graphically by the intersection of the no load excitation curve of the machine and the load line of the exciting capacitors. In Figure 2 the line voltage as a function of speed for different conditions of load is illustrated. Upon increase in speed the terminal voltage will increase and the frequency will increase. Application of load to the machine causes the terminal voltage to decrease rather abruptly resulting in an inherently poor voltage regulation characteristic. Since the frequency of an induction generator is directly proportional to the rotor speed minus the slip speed, and the slip speed increases with load, the frequency decreases with an increase of load, assuming other conditions to remain the same. These features of behavior are significant characteristics of the induction generator.

The operation of an induction generator as a constant voltage-constant frequency source is not practical without resort to variable excitation which requires complex equipment that is undesirable in many applications. With fixed excitation, regulation of terminal voltage can be accomplished by varying rotor speed with the result of variation of the frequency of the generator voltage. Regulation to achieve a constant frequency could be accomplished by variation of rotor speed at the expense of extreme variation in terminal voltage. Either voltage or frequency regulation is therefore unsuitable for many types of load apparatus.

In accordance with this invention the induction generator is adapted to supply electrical power at a fixed ratio of voltage to frequency or volts per cycle. Regulation of volts per cycle is found to be especially suitable for generator operation and very desirable from the load standpoint, particularly in the case of load devices of the electromagnetic type, such as induction motors. It is well known that the induction motor operates to develop a constant value of maximum torque when operated at a constant value of voltage per cycle. This relation obtains because torque is a function of air gap flux and hence magnetizing current which varies directly with voltage and inversely with frequency.

Referring again to Figure 1, the system for regulating the induction generator 10 to develop a constant value of voltage per cycle will be explained. Conductors 42 and 44 are connected across the neutral point 46 of the stator windings and the intermediate tap 21 of the winding 20 to derive a control voltage. This control voltage, which is proportional in amplitude and equal in frequency to the line voltage developed across the output terminals, is applied to the volts per cycle responsive relay 16 at the input terminals 48 and 50 of an inductive energizing coil 52. The relay 16, suitably mounted on a support or housing member 56, is provided with linearly displaceable armature 58.

Figure 4:
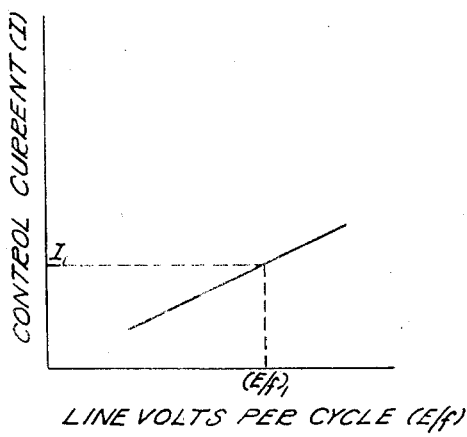
Figure 4 illustrates typical characteristics of a voltage per cycle responsive relay.

The winding 52 of the relay 16 is preferably predominantly inductive in character so that the resistance of the winding constitutes only a small portion of the total impedance. For explanatory purposes, it may be assumed that the resistance value is negligible in comparison with the value of inductive reactance. Therefore, when an alternating voltage is impressed across the input terminals 48 and 50 the current flow through the winding is directly proportional to the voltage amplitude and inversely proportional to the frequency. As shown in Figure 4, the control current I in winding 52 is an approximately linear function of the ratio of the line volts per cycle, $E/f$. Therefore, the force exerted on the armature 58 of relay 52 is a direct function of the volts per cycle developed by the generator stator windings.

In order to enhance the control force developed by the armature 58, a power actuator or servo, designated generally at 62, is provided. The servo 62 comprises an hydraulic cylinder 64, suitably mounted on the housing 56, and an associated control valve, designated generally at 66, adapted for actuation by the armature 58. The control valve 66 comprises a valve cylinder 68 closed at one end by a threaded plug 70. A spool valve 72 is provided with spaced lands 74 and 76 which define an annular chamber therebetween. The spool valve 72 is connected by the rod 80 to the armature 58. The rod 80 extends through the threaded member 82, which closes the other end of the valve cylinder 68, and is journalled in the support plate 84 for reciprocating motion. Between one end of the spool valve 72 and member 82 is interposed a bias spring 86 which resiliently urges the spool valve 72 in a direction opposite the force exerted by the armature 58. A damping spring 88 is interposed between the other end of spool valve 72 and the plug 70 to retard motion of the spool valve in one direction and a similar damping spring 91 is interposed between a stop ring 92 on rod 80 and the plate 84 to retard motion in the other direction. The valve cylinder 68 is provided with a fluid pressure inlet passage 93 connected with a suitable source of hydraulic pressure (not shown) and is provided with a fluid outlet or exhaust passage 95. The valve cylinder 64 defines a main fluid distribution passage 92 extending into the cylinder 64 and a pair of restricted distribution passages 94 and 96 which are disposed on opposite sides of the main passage and also extend into the cylinder 64. A piston 98 is disposed in the cylinder 64 and is energized by hydraulic pressure supplied by control valve 66. A piston rod 100 extends through the cylinder cap 102 and is adapted to actuate and control a variable speed governor designated generally at 104.

The governor 104 may be of conventional construction of the type adapted to be adjusted for regulating the speed of a prime mover to any desired value. The governor, mounted on housing 56 by a pair of brackets 106 and 108, includes a speed control lever 110 which is pivotally supported by pin 113 on the governor housing 114. The speed control lever 110 is in engagement with piston rod 100 for actuation thereby to reset a governor speeder spring 116. The speeder spring 116 is interposed between one arm of the speed control lever 110 and one arm 112 of a power lever 120. The power lever 120 is mounted for rotation with a governor power shaft 122 which is connected to the governor speed responsive mechanism 124 such as a conventional flyball arrangement adapted to produce a rotative effort proportional to speed. The speed responsive mechanism is mechanically coupled to prime mover 12 by a shaft 125. It will be apparent that the rotative force of the power lever 120 tends to compress the spring 116 against lever 110 until this force is balanced by the spring force. The rotative motion of the power shaft 122 is transmitted to a differential or control lever 124 which is pivotally mounted on the other arm 126 of the power lever 120 and pivotally secured by pin 128 to a manual speed control mechanism 130. Thus the control lever 124 assumes a position, when the governor shaft force is balanced by the spring force, determined by the position of the speed control lever 110. The control lever 124 is connected by linkage 134 to a suitable speed control means 18 for the prime mover 12. The variable speed prime mover 12 is preferably an internal combustion engine since it provides very desirable speed regulation characteristics. A diesel engine is especially suitable in which case the speed control means 18 may take the form of a fuel injector rack. The output shaft 136 of the prime mover 12 is connected by appropriate mechanical coupling to the shaft 40 of the inductor generator rotor 38.

Figure 3:
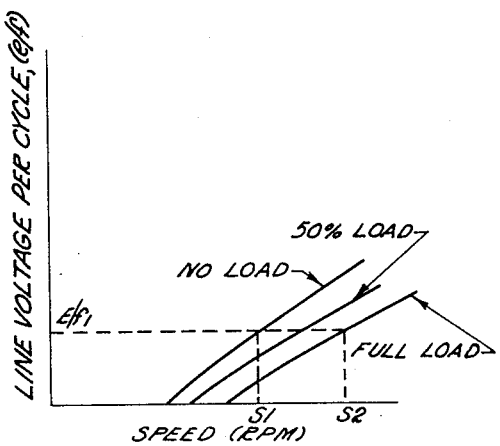
Figure 3 illustrates typical characteristics of an induction generator showing the variation of voltage per cycle as a function of speed.

In operation, assume that the generator is started under no load and that the system is to be operated with the generator volts per cycle ratio to be regulated at a value of $(E/f)_1$. This value corresponds to a particular value of control current, $I_1$, as shown in Figure 4 and to a prime mover and generator speed of $S_1$ as shown in Figure 3. During the starting period and before the generator field has been built up, no voltage is generated and the control current is zero. Therefore, no force is exerted by the armature 58 and the spool valve 72 is in the extreme left hand position under the influence of bias spring 86. In this position, land 74 uncovers restricted passage 96 and main passage 92 and fluid pressure is admitted to cylinder 64. The piston 98 displaces the speed control lever 110 downwardly which increases the force exerted by speeder spring 116 causing rotation of the power lever 120. This rotation displaces the control lever 124 and the control linkage 134 in a direction to cause the speed control means 18 to increase the prime mover speed. As the speed is increased and the generator field builds up, the ratio $E/f$ increases causing the control current I to increase and the armature 58 pulls the valve 72 against the resistance of bias spring 86 until land 74 closes the passage 92. The speed continues to increase until it reaches the value $S_1$ and the control current reaches the value $I_1$ and the valve land 74 closes the restricted passage 96. At this regulated speed $S_1$ the desired generator volts per cycle ratio $(E/f)_1$ is achieved. In this condition the speeder spring 116 exerts a force through control lever 110 against the piston 98 and a slight amount of oil leakage past the piston occurs permitting a slight decrease in the force exerted by speeder spring 116. This permits the engine speed to be reduced causing a slight decrease in the generated voltage per cycle ratio $E/f$. This decreases the control current slightly, permitting the spool valve to move to the left uncovering the restricted passage 96. Thus, additional oil pressure is introduced into cylinder 64 to reset the speeder spring 116 and to bring the prime mover and generator back up to speed. This action is repetitive at a high rate causing slight fluctuation of the generated volts per cycle ratio about the regulated value. This fluctuation is of such frequency and small value that it is not detrimental to the system operation.

Assume now that a load such as induction motor 14 is connected across the generator output terminals 26, 28 and 30. This load causes a decrease in engine speed and a decrease in the value of the volts per cycle ratio. A corresponding decrease in the control current I occurs, causing the spool valve 72 and land 74 to move to the left and uncover restricted passage 96. If the change of load is sufficiently large the main passage 92 will also be uncovered to permit a high rate of correction of the departure from the regulated value. Overshooting during correction to the regulated value following a change of condition is prevented by coordinated action of the passages 92, 94, and 96 and the damping springs 88 and 91. Upon a decrease in the generated volts per cycle, the bias spring 86 displaces the valve 76 to the left. When this displacement is just sufficient to uncover restricted passage 96, the damping spring 88 is engaged by the valve 72 and thus additional force is required for further displacement. This occurs only upon a large decrease of generated volts per cycle in which case the land 74 is displaced sufficiently to uncover the main passage 92 as well as restricted passage 96. The corrective action thus occurs at a much greater rate during a large deviation from the regulated value. The result of the corrective action thus far described is to increase the fluid pressure in cylinder 64 which displaces control lever 110 and increases the force exerted by speeder spring 116. The power lever 120 is rotated causing displacement of linkage 134 in a direction to increase engine speed to a value greater than $S_1$. Thus, the generated volts per cycle ratio is increased and the control current is increased to the value $I_1$ corresponding to the desired volts per cycle value $(E/f)_1$. In this condition, the force of bias spring 86 just balances the force exerted by the armature 58 so that the valve land 74 covers passages 92, 94, and 96. Under this condition of load, a new operating speed is established. As described above, slight fluctuation about the regulated value occurs for this condition.

Assuming that the load is increased to the full load value such as by connection of an additional motor 14', the regulating system will cause an increase of prime mover and generator speed in the manner described above to maintain the control current at the value $I_1$. This establishes the volts per cycle ratio at the prescribed value of $(E/f)_1$ and the operating speed is established at $S_2$. If the load is decreased, the speed increases momentarily and the generated volts per cycle departs from the regulated value of $(E/f)_1$. As a result the pull of armature 58 exceeds the force of spring 86 causing passage 94 to be uncovered by land 74 permitting exhaust of the pressure from cylinder 64 through exhaust passage 95. If the change of load is sufficiently large the retarding force of damping spring 91 will be overcome and main passage 92 will also be uncovered to permit a high rate of correction of the departure from regulated value. The damping spring 91 operates in the same manner as spring 88 to permit rapid correction during large deviation and slow correction during small deviation, upon a decrease of load. The speed control lever 110 thus moves upwardly to decrease the prime mover and generator speed to re-establish the regulated value of volts per cycle $(E/f)_1$.

The description of this invention has been presented with reference to a particular embodiment and it is not to be construed in a limiting sense upon the scope of the invention. Many modifications and variations within the spirit and scope of the invention will now occur to those skilled in the art. For a definition of the invention, reference is made to the appended claims.

I claim:

1. An electrical power system comprising a self-excited induction generator, an electrical load connectible to the generator, a variable speed prime mover drivingly connected to the generator, a relay having its input means connected with the generator and being responsive to the ratio of the amplitude and frequency of the voltage generated thereby for developing at its output means a control quantity corresponding to said ratio, and speed control means for the prime mover connected with the output means of the relay for maintaining the generated volts per cycle at a constant value.

2. An electrical power system comprising a variable speed prime mover, a self-excited induction generator driven by the prime mover, a lagging power factor load connectible to the generator for energization thereby, a relay having its input means connected with the generator and being responsive to the ratio of the amplitude and frequency of the voltage generated thereby for developing at its output means a control quantity corresponding to said ratio, and speed control means for the prime mover actuated by the output means of the relay.

3. A regulating system for a self-excited induction generator comprising a variable speed prime mover drivingly connected to the generator, speed control means for the prime mover, and relay means electrically energized by the generator and connected to the speed control means, said relay means being adapted to produce a displacement of the control means proportional to a change in the ratio of volts per cycle of the generator whereby the generator output is regulated to a constant value of volts per cycle.

4. An electrical power system comprising a variable speed prime mover, a self-excited induction generator driven by the prime mover, an induction motor electrically energized by the generator, a relay having its input means connected with the generator and being responsive to the ratio of the amplitude and frequency of the voltage generated thereby for developing at its output means a control quantity corresponding to said ratio, and speed control means for the prime mover actuated by the output means of the relay whereby the induction motor is energized at a constant value of volts per cycle.

5. In combination, a self-excited induction generator, an electrical load connected thereto, a variable speed prime mover drivingly connected to the generator, a relay including an armature and an inductive energizing winding being electrically connected to the generator whereby the armature exerts a force corresponding to the ratio of the voltage amplitude and frequency of the generated voltage, a variable speed governor connected to the prime mover, and means connecting said armature to said governor whereby said governor is reset in response changes in load on the generator to maintain the voltage per cycle ratio of the generator at a constant value.

6. An electrical power system comprising a variable speed prime mover, a self-excited induction generator driven by the prime mover, an electrical load energized by the generator, a relay having an inductive energizing winding electrically connected to the generator and an armature whereby the armature exerts a force corresponding to the ratio of the voltage amplitude and frequency of the generated voltage, servo means including a control element connected for actuation by said armature and a power output member, a variable speed governor connected to the prime mover having a speed determining member actuated by said power output member, whereby the governor is reset in response to changes in volts per cycle of said generator.

7. An electrical power system comprising a variable speed prime mover, a self-excited induction generator driven by the prime mover, an electrical load energized by the generator, a relay having an inductive energizing winding connected to the generator and an armature whereby the armature exerts a force corresponding to the ratio of the voltage amplitude and frequency of the generated voltage, hydraulic servo means including a control valve connected for actuation by the armature and a power output piston, a variable speed governor including a speeder spring adapted to be reset by the power output piston, and speed control means for the prime mover connected to the governor.

8. An electrical power system comprising a variable speed prime mover, a self-excited induction generator driven by the prime mover, an electrical load energized by the generator and subject to intermittent changes, a relay having an inductive energizing winding connected to the generator and an armature whereby the armature exerts a force corresponding to the ratio of the voltage amplitude and frequency of the generated voltage, hydraulic servo means including a valve chamber and a movable control valve therein connected to said armature for displacement in one direction, a bias spring urging said valve in the other direction, a hydraulic cylinder and a piston movable therein, the valve chamber defining a main fluid passage and a pair of restricted passages disposed on opposite sides thereof communicating with the cylinder, said valve being normally positioned by said bias spring and said armature to cover all of said passages, a variable speed governor connected to the prime mover for regulating the speed thereof, speed control means on the governor actuated by said piston in response to a load change causing departure of the generator volts per cycle from a regulated value and displacement of said valve in either direction to uncover one of said restricted passages, and resilient damping means preventing the displacement of said valve to uncover said main passage until the departure from the regulated value exceeds a predetermined value.

9. An electrical generating system comprising a variable speed prime mover, a self-excited polyphase induction generator driven by the prime mover, the generator including Y-connected stator windings and a squirrel cage rotor, output terminals connected across intermediate taps on said windings and an exciting capacitor connected across each set of adjacent winding terminals, an induction motor load connected across the output terminals, a relay having an armature and an inductive energizing winding connected across one of said output terminals and the neutral point of said windings whereby the armature exerts a force corresponding to the ratio of the voltage amplitude and frequency of the generated voltage, hydraulic servo means including a control valve connected for actuation by the armature and a power output piston, and a variable speed governor connected to the prime mover and including a speed determining member actuated by the power output piston.

10. A generator system comprising an induction generator, a prime mover drivingly connected to the generator, a relay having its input means electrically connected with the generator and being responsive to the ratio of the amplitude and frequency of the voltage generated thereby for developing at its output means a control quantity corresponding to said ratio, and speed control means for the prime mover connected with said output means and responsive to said control quantity for adjusting the speed of said prime mover.

11. A generator system comprising a self-excited induction generator, a variable speed internal combustion engine drivingly connected to the generator, a relay having its input means electrically connected with the generator and being responsive to the ratio of the amplitude and frequency of the voltage generated thereby for developing at its output means a control quantity corresponding to said ratio, speed control means for the engine connected with said output means and responsive to said control quantity for regulating the speed of said engine.

12. In combination with an alternating current generator, a variable speed prime mover drivingly connected to the generator, a relay having its input means connected with the generator and being responsive to the ratio of the amplitude and frequency of the voltage generated thereby for developing at its output means a control quantity corresponding to said ratio, speed control means for the prime mover connected with said output means and responsive to said control quantity for regulating the speed of said prime mover to maintain said ratio at a constant value.

13. The method of operating a self-excited induction generator comprising imparting rotation to the rotor, deriving a control voltage proportional in amplitude and equal in frequency to the output voltage of the generator, deriving from the control voltage an electrical signal proportional in magnitude to the ratio of the amplitude and frequency of the control voltage, developing a displacement corresponding to the magnitude of the said electrical signal, and adjusting the rotation speed of the rotor in accordance with said displacement whereby said ratio of amplitude and frequency is maintained at a constant value.

14. The method of operating a self-excited induction generator comprising imparting rotation to the rotor, deriving a control voltage proportional in amplitude and equal in frequency to the output voltage of the generator, deriving from the control voltage an electrical signal proportional in magnitude to the ratio of the amplitude and frequency of the control voltage, producing a force corresponding to the magnitude of said electrical signal, developing a displacement corresponding to the magnitude of said force, and adjusting rotational speed of the rotor in accordance with the magnitude of said displacement whereby said ratio of amplitude and frequency is maintained at a constant value.

References Cited in the file of this patent

UNITED STATES PATENTS

| 1,584,602 | Bradshaw et al. | May 11, 1926 |
| 2,625,660 | Lytle | Jan. 13, 1953 |

FOREIGN PATENTS

| 227,882 | Great Britain | Jan. 22, 1925 |

UNITED STATES PATENT OFFICE
CERTIFICATE OF CORRECTION

Patent No. 2,922,895                          January 26, 1960

Earl D. Smith

It is hereby certified that error appears in the printed specification of the above numbered patent requiring correction and that the said Letters Patent should read as corrected below.

Column 3, line 12, for "generator" read -- generated --; column 4, line 56, for "inductor" read -- induction --.

Signed and sealed this 16th day of August 1960.

(SEAL)
Attest:

KARL H. AXLINE
Attesting Officer

ROBERT C. WATSON
Commissioner of Patents